July 7, 1959

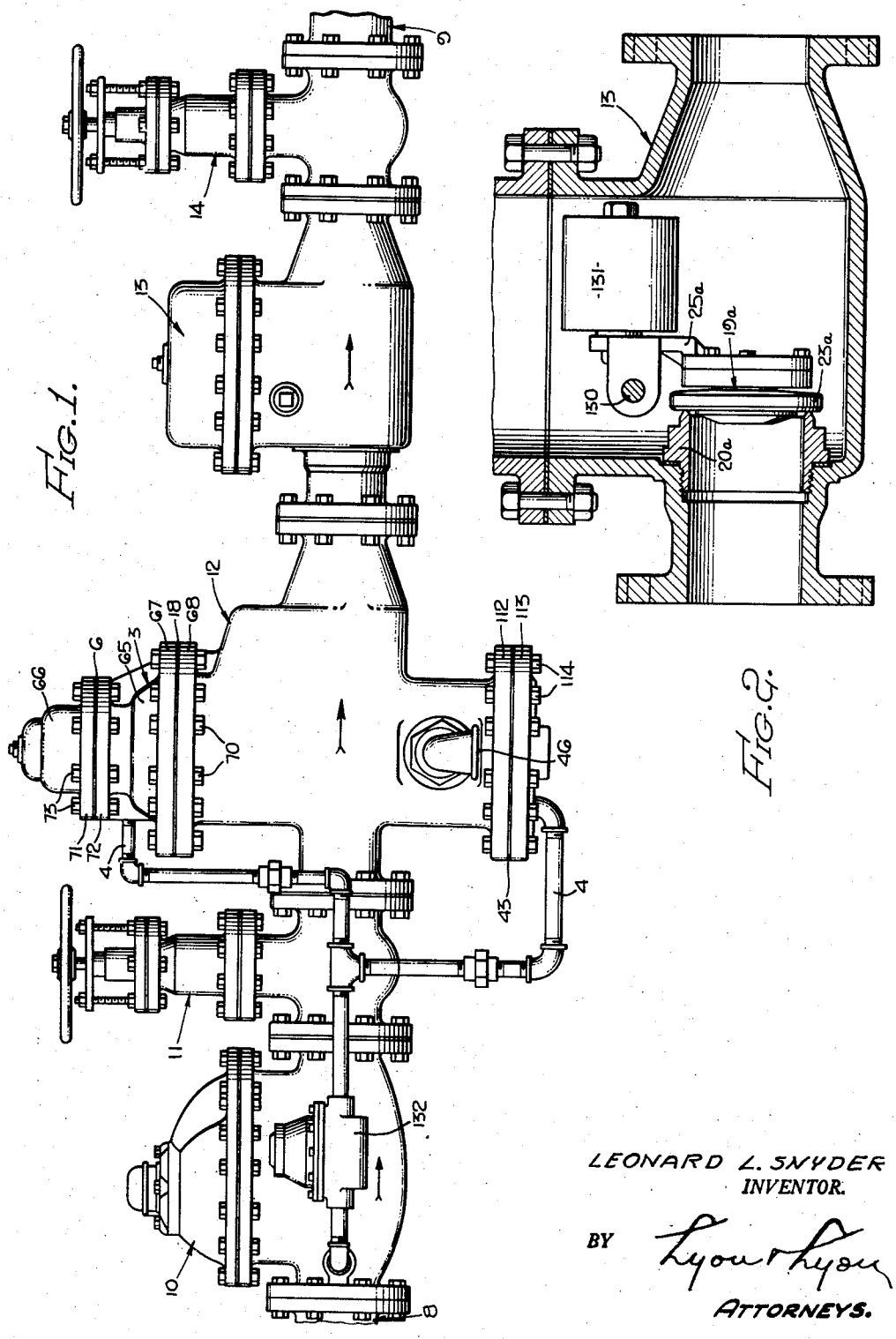

L. L. SNYDER 2,893,414

BACKFLOW PREVENTER

Original Filed Oct. 27, 1951

LEONARD L. SNYDER
INVENTOR.

BY *Lyon & Lyon*
ATTORNEYS.

July 7, 1959

L. L. SNYDER 2,893,414

BACKFLOW PREVENTER

Original Filed Oct. 27, 1951

LEONARD L. SNYDER
INVENTOR.

BY
ATTORNEYS.

July 7, 1959

L. L. SNYDER 2,893,414

BACKFLOW PREVENTER

Original Filed Oct. 27, 1951

LEONARD L. SNYDER
INVENTOR.

BY Lyon & Lyon

ATTORNEYS.

United States Patent Office 2,893,414
Patented July 7, 1959

2,893,414
BACKFLOW PREVENTER

Leonard L. Snyder, Los Angeles, Calif., assignor to Backflow Engineering & Equipment Co., a copartnership Original application October 27, 1951, Serial No. 253,481. Divided and this application November 27, 1956, Serial No. 624,636

26 Claims. (Cl. 137—116)

This invention relates to apparatus for preventing backflow from a service line to a supply line and is concerned with improvements over apparatus of the type shown in the Carlton Patents Nos. 2,389,412 and 2,389,413 and the Carlton, et al. Patent No. 2,491,604. The present invention relates to backflow prevention apparatus of the reduced pressure type which is capable of handling relatively large rates of flow with a minimum pressure drop through the apparatus. The invention is also directed to such a device having a clear-way passage of a size equal to the size of the line in which it is installed so that no obstructions are present to trap foreign material. A ball of the largest size which will pass through the line will also pass through such a clear-way passage. Backflow prevention apparatus of this type capable of handling large flow rates and having a clear-way passage is particularly well suited for use in fire lines in large industrial or office buildings, but such devices are not limited to this particular use.

This application is a division of my copending application, Serial No. 253,481, filed October 27, 1951 and entitled "Backflow Preventer," which application was allowed and forfeited.

One of the objects of the present invention is to provide backflow prevention apparatus which takes advantage of the pressure drop across the conventional meter or other device in the supply line during flow conditions and particularly under conditions of heavy flow, to assist in holding open a valve in the main fluid passageway through the backflow preventing apparatus. Under conditions of no flow through the meter and the device there is no pressure drop across the meter, and consequently the valve within the housing is no longer held open but is closed by means of a spring or other suitable means.

Another object is to provide a backflow preventer having a valve movable by an actuator to open a passage through the housing, together with a pilot valve which serves to render the actuator inoperable under conditions of no flow through the passage.

Another object is to provide such a device employing a spring to close the valve.

Another object is to provide a device of this type having an equalizer device associated with the pilot valve for bleeding off pressure fluid supplied through the pilot valve for operating a diaphragm-type actuator, and without any external discharge of fluid to the atmosphere.

Another object is to provide a backflow preventer having a valve moved in one direction by a spring and in the other direction by a diaphragm, together with novel means for rendering the spring inoperative to permit ready disassembly of the valve spring, diaphragm and related parts from the interior of the housing.

A more detailed object is to provide a pressure-raising device which acts on the Pitot-tube principle which is used in the absence of a meter in the service line to provide a pressure differential under heavy flow conditions for maintaining the main valve in open position.

Fire lines for supplying water for fire fighting purposes may not be provided with a meter. When no meter is employed, it is desirable to provide some means for detecting unauthorized use of the water for other than fire fighting purposes. Certain forms of this invention are particularly suited for use with a small meter which eliminates the need for a conventional detector check to indicate unauthorized use of the water.

Other objects and advantages will appear more fully hereinafter.

In the drawings:

Figure 1 is a side elevation showing backflow prevention apparatus embodying a preferred form of my invention.

Figure 2 is a sectional view partly broken away showing the second check valve assembly illustrated in Figure 1.

Figure 3:
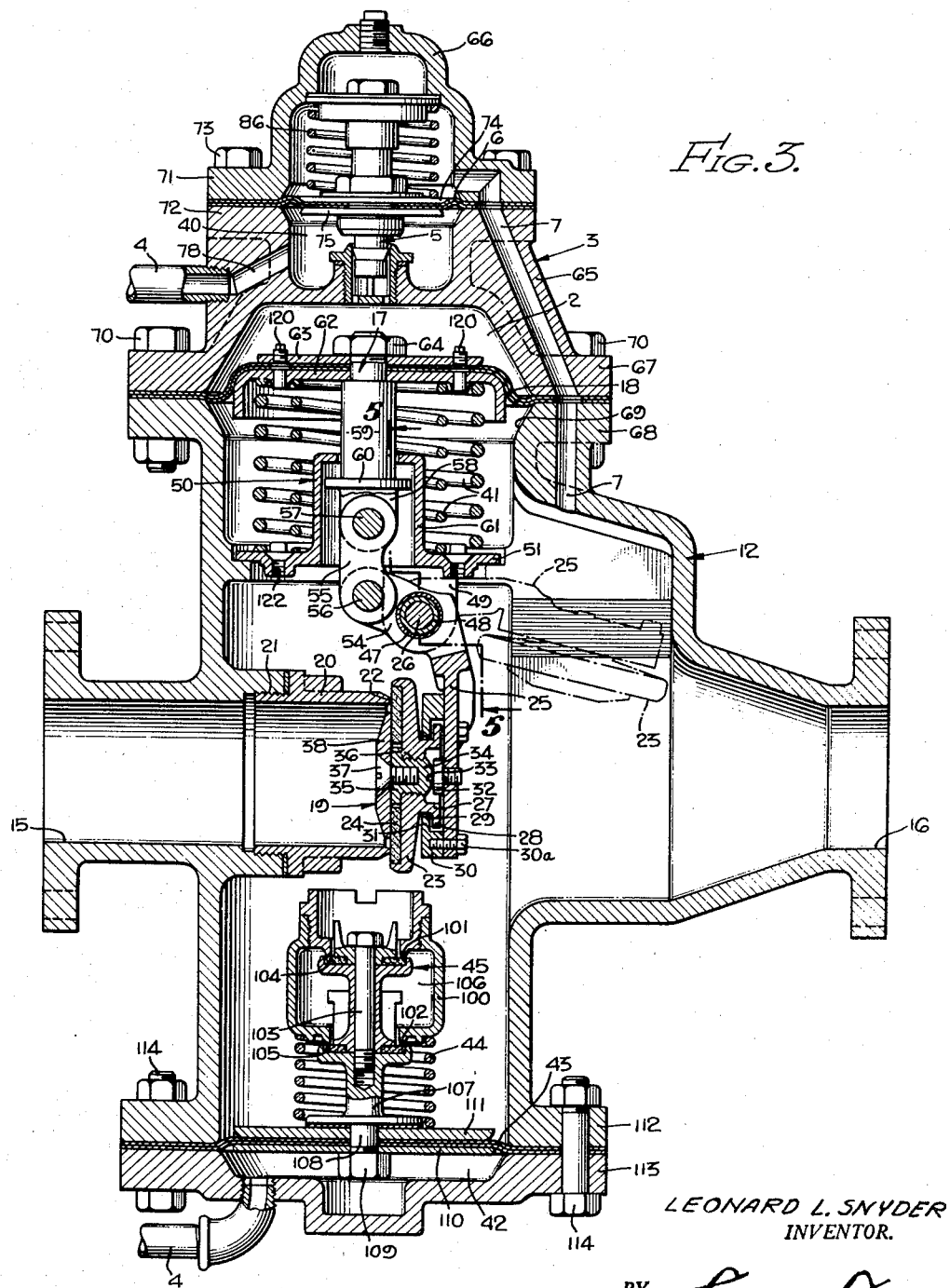
Figure 3 is a transverse sectional elevation of a portion of the apparatus shown in Figure 1.

Referring to the drawings, the appartus shown in Figure 1 is intended to be installed between a supply line 8 and service line 9, and its general over-all function is to prevent return flow from the service line into the supply line.

The flow-measuring meter 10, gate valve 11, housing 12, check valve 13, and gate valve 14 are connected in that order. This backflow prevention apparatus is of the reduced pressure type since it provides between two check valves a zone which is lower in pressure than the supply line pressure during flow and at cessation of flow. A drain valve vents the reduced pressure zone to atmosphere in the event of failure of supply line pressure so that backflow into the supply line is prevented even if the check valves should leak.

In accordance with my invention, and as shown in Figure 3, the housing 12 is provided with bores 15 and 16 which serve as an inlet and outlet respectively. A main valve assembly generally designated 19 is located within the housing 12 and serves to close the inlet 15. An actuator generally designated 17 is mounted within the housing and is operatively connected to swing the valve 23 between opened and closed positions. This actuator 17 includes a flexible diaphragm 18 which is subjected on one side to the pressure of the reduced pressure zone within the housing 12 and on the other side to the pressure within the chamber 2. The chamber 2 is formed within a bonnet assembly 3 affixed to the housing 12. Pressure reaches the chamber 2 by way of a pressure supply conduit 4 and pilot valve 5. A second flexible diaphragm 6 controls the operation of the pilot valve 5. The upper side of this diaphragm is subjected to pressure within the housing 12 via passageway 7 while the lower side of the diaphragm 6 is subjected to pressure in the space 40.

When the unit pressure supplied in the conduit 4 exceeds the unit pressure within the housing 12 by a predetermined margin, the pilot valve 5 opens to permit flow of fluid into the chamber 2. Pressure above the diaphragm 18 opposes the action of the compression springs 41 to swing the valve 23 to open position. The pressure supply conduit 4 also communicates with the space 42 below the third flexible diaphragm 43. If for any reason the pressure in the supply line 8 should fail, the springs 41 return the valve 23 to closed position and the diaphragm 43 allows the spring 44 to open the drain valve assembly 45 so that the fluid within the housing 12 is drained to atmosphere through the lateral port 46 (see Figure 1).

The main valve assembly 19 includes the tubular seat member 20 which is aligned with the inlet 15 and outlet 16 and which is connected to the housing 12 by means of threads 21. An annular seating surface 22 is provided on the downstream end of the seat member 20. The valve 23 includes an annular disk 24 which is adapted to engage the seat 22 to form a seal. The valve 23 is carried on a swinging arm 25 which turns about the axis of the pivot pin 26. The arm 25 may be swung to bring the valve 23 to its fully open position as shown by the dotted lines in Figure 3, and in this fully open position there is a clear-way passage from the inlet 15 to the outlet 16. Thus, there are no obstructions to trap foreign material. It is apparent that a ball of the maximum size which will pass through the supply line 8 will also pass through the clear-way passage through the housing 12.

The connection between the swinging arm 25 and the valve 23 is such that the valve has self-aligning movement with respect to the arm 25 and is thus able to form a tight shut-off against the annular seat 22 continuously around the circumference of the seat under a minimum of pressure applied by the arm 25. As best shown in Figure 3 of the drawings, a valve head 27 is provided with a flange 28 and a groove 29. An annular ring 30 is fixed to the arm 25 by threaded fastenings 30a and this ring has an inwardly directed lip 31 which is loosely received within the groove 29. The valve head 27 is thus free to tilt in any direction with respect to the arm 25 and the ring 30. A central button 32 is fixed on the arm 25 and is provided with a flat hardened face 33. This face 33 is contacted by the spherical portion 34 of the bushing 35. This bushing is fixed centrally to the valve head 27 by means of threads 36. A screw fastening 37 is threaded into this bushing 35 and extends through the clamp ring 38 to hold the valve disk 24 in position on the head 27. The contacting surfaces 33 and 34 are located radially inwardly of the interengaging lip 30 and groove 29 and the surfaces 33 and 34 have point contact substantially on the axis of the valve head 27.

An outstanding advantage of the connection just described between the swinging arm 25 and the valve 23 is that a minimum of sliding action along interfitting surfaces is required to enable the valve disk 24 to align itself with the stationary seating surface 22. A minimum of friction is developed and accordingly the forces required to form an effective seal completely around the circumference of the seat 22 are considerably reduced. The only parts transmitting thrust between the arm 25 and the valve head 27 are the button 32 and bushing 35 and, since these parts have only point contact, very little friction is present.

Figure 5:
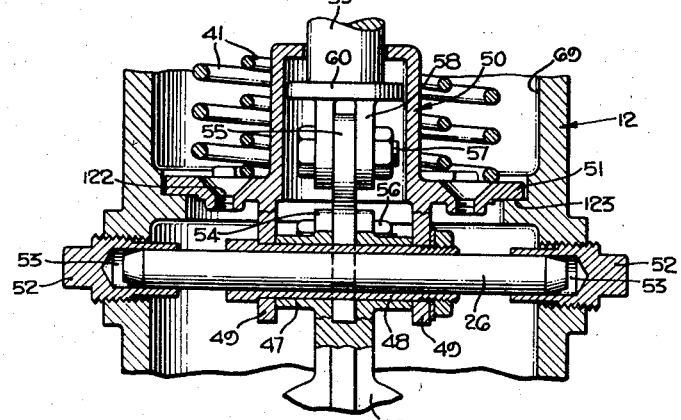
Figure 5 is a sectional elevation partly broken away taken on line 5—5 as shown in Figure 3.

The arm 25 has a hub portion 47 (Figure 5) which receives a pivot tube 48. This pivot tube extends between spaced parallel ears 49 which are formed integrally with the spider 50 and which extend downward from the lower flange 51 thereof. The pivot pin 26 is loosely received within the pivot tube 48 and the ends of the pin 26 are pivotally supported with respect to the housing 12. Aligned externally threaded elements 52 are mounted on the walls of the housing 12 and are provided with aligned bores 53 to receive the ends of the pivot pin 26. From this description it will be understood that the pivot pin 26 may be removed from the housing by first removing the support elements 52 and then moving the pin 26 axially out of the pivot tube 48. Disassembly of this pivot pin 26 does not disconnect the pivotal connection between the swinging arm 25 and the spider 50, since these parts are connected by the tube 48 and ears 49.

The crank 54 on the forward end of the swinging arm 25 is connected to the link 55 by means of pin 56. Pin 57 connects the link 55 to the bifurcated end 58 of the axially movable stem 59. A flange 60 formed integrally on the stem 59 is guided for movement within the central upstanding sleeve 61 of the spider 50.

The stem 59 forms a part of the actuator generally designated 17. The upper end of the stem 59 is reduced in size and extends through an aperture in the central portion of the flexible diaphragm 18. A pair of plates 62 and 63 are held in position by the nut 64 on the upper end of the stem 59 and serve to clamp the central portion of the flexible diaphragm 18 between them. The compression springs 41 engage the plate 62 at one end and engage the lower flange 51 of the spider 50 at the other end. The springs 41, therefore, act to lift the stem 59 vertically.

The bonnet, generally designated 3, includes the adapter 65 and the cap 66. The adapter 65 is provided with a lower flange 67 which rests on the upper flange 63 provided on the housing 12. A lateral opening 69 is provided within the housing 12 and the flange 68 encompasses this opening. The outer rim of the flexible diaphragm 18 is clamped between the mating flanges 67 and 68 and held in place by means of the bolts 70. Pressure within the chamber 2 above the flexible diaphragm 18 is effective to move the actuator downward against the action of the springs 41 and to cause pivotal movement of the arm 25 about the axis of the pivot pin 26, thereby opening the valve assembly 19.

The cap 66 is fixed on the adapter 65 by means of mating flanges 71 and 72 and bolts 73. The outer rim of the diaphragm 6 is clamped between the flanges 71 and 72. The inner portion of the flexible diaphragm 6 is clamped between plates 74 and 75 mounted on the head 76 of the pilot valve, generally designated 5. A nut 77 threaded on the head 76 maintains the plates 74 and 75 in clamped position. The space 40 below the diaphragm 6 is connected by passage 78 to the pressure supply conduit 4. Accordingly, the lower face of the diaphragm 6 is subjected to the pressure in the supply conduit 4. The upper face of the diaphragm 6 is connected to the interior of the housing 12 by means of the passageway 7. A stationary seat 79 having a central bore 80 and an annular seating surface 81 is fixed on the adapted 65 by means of the threads 82. The seating surface 81 is adapted to be engaged by the disk 83 mounted on the pilot valve head 76 and held in place by means of the threaded retainer 84 and bushing 85. When the pilot valve head 76 moves downward under action of the compression spring 86, the disk 83 engages the annular seating surface 81, thereby closing the pilot valve.

An auxiliary sealing device is provided on the valve head 76 which is effective to shut off any substantial flow from the space 40 through the bore 80 and in the pressure chamber 2 at all times except when the valve head 76 approaches its fully open position. A rubber ring 37 of the lip type is carried on the valve head and is clamped in position between the retainer 84 and the bushing 85. The upper lip on this ring 87 engages the bore 80 of the seat member 79 during the major portion of the travel of the valve head 76. When the valve head 76 approaches its fully open position, the rubber ring 87 moves up and out of the bore 80 so that flow of fluid may take place from the space 40 through the bore 80 and into the pressure chamber 2.

An equalizer valve, generally designated 88, includes a stem 89 having an enlarged valve head 90 thereon which engages a seating surface 91 formed on the pilot valve head 76. A small rod 92 is formed integrally with the stem 89 and head 90 and projects downward through the bore 93 of the retainer 84. A compression spring 94 acts to hold the valve 90 on its seat 91. The purpose of this equalizer valve 88 is to permit escape of fluid under pressure from the chamber 2 under action of the compression springs 41. Thus, whenever the unit pressure within the interior of the cap 66, acting together with the compression spring 86, is able to move the diaphragm 6 and the valve head 76 downward against the pressure in the space 40, the lower end of the rod 92 strikes the stationary abutment 95 and prevents further downward movement of the stem 89 and valve head 90. The seat 91 continues to move downward, thereby separating the valve 90 and seat 91. Fluid may then flow from the pressure chamber 2 through the ports 96, bore 80, bore 93 and lateral ports 97, to the interior of the cap 66. The flow may then pass through the passageway 7 into the interior of the housing 12. This flow equalizes the pressure across diaphragm 18.

When the pilot valve 76 is in its uppermost position, that is, fully open, the rubber sealing ring 87 is positioned above the seating surface 81 on the seat member 79 and hence does not offer any restriction to passage of fluid from the space 40 through the bore 80 and ports 96 to the pressure chamber 2. In this position of the parts, the lower end of the rod 92 is located above the abutment 95 and hence the equalizer valve 88 remains closed. Fluid under pressure in the space 40 therefore cannot pass outward through the equalizer valve 88. When pressure within the cap 66 approaches the value of the pressure existing in the chamber 40 within a predetermined amount, the pilot valve head 76 moves downward under action of spring 86, bringing the rubber sealing ring into sealing engagement with the bore 80 in the seat member 79. Further downward movement of the pilot valve head 76 brings the lower end of the rod 92 into engagement with the abutment 95, thereby opening the equalizer valve 88. The downward movement of the head 76 is arrested when the disk 83 engages the seating surface 81.

The drain valve assembly 45 is preferably the same as that shown in my Patent 2,503,424, issued April 11, 1950. This valve assembly includes a stationary body 100 located below the level of the inlet 15 and provided with a pair of axially spaced concentric seats 101 and 102. The movable valve stem 103 is provided with axially spaced disks 104 and 105 which engage the seats 101 and 102, respectively. The cavity 106 in the body 100 is vented to atmosphere through the lateral port 46 (see Figure 1). The valve stem 103 is connected to the central portion of the flexible diaphragm 43 by means of the spool 107, projection 108, nut 109 and clamp plates 110 and 111. The outer rim of the flexible diaphragm 43 is clamped between mating flanges 112 and 113 and is maintained in assembled relationship by means of the bolts 114. When the unit pressure in the space 42 and below the diaphragm 43 decreases and approaches within predetermined limits the unit pressure in housing 12, the spring 44 moves the stem 103 downward to separate the sealing disks from their respective valve seats. This action places the cavity 106 in communication with the interior of the housing 12 with the result that the fluid in the housing 12 drains out through the port 46. The valve assembly 19 is closed at the time the drain valve 45 opens, and the result is that backflow of fluid from the service line 9 cannot enter the supply line 8 but on the contrary is drained out through the lateral port 46. This drainage takes place while the pressure within chamber 12 is a predetermined amount below the intensity of the pressure in the supply line 8.

Figure 6:
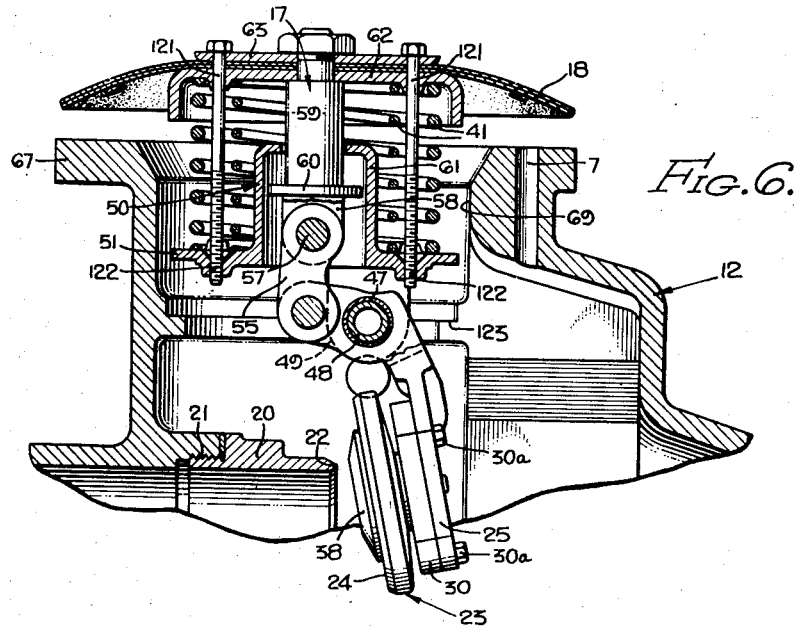
Figure 6 is a sectional elevation partly broken away showing the manner of disassembly of certain of the parts shown in Figure 3.

An advantageous feature of my invention lies in the novel manner in which the operating parts may be assembled and disassembled with respect to the housing 12. It is highly desirable that the operating parts be replaceable without requiring that the housing 12 be disconnected from the line. In Figure 6 I have shown how the valve 23, swinging arm 25 and associated parts, may be withdrawn laterally through the opening 69 in the housing 12. The adapter 65 is first removed from the housing after disconnecting the bolts 70. The plugs 120 (Figure 3) are then removed from the upper clamping plate 63. Tension bolts 121 are then inserted axially through the openings formerly closed by the plugs 120 and are threaded into the sockets 122 provided in the lower flange 51 of the spider 50. The flange 51 normally rests on the shoulder 123 provided within the housing 12. The tension bolts 121 are then turned to compress the springs 41 a short distance and thereby move the stem 59 of the actuator 17 downward with respect to the spider 50. The pivot plugs 52 (Figure 5) are then withdrawn and the pivot pin is moved axially out of the housing 12. The swinging arm 25 remains connected to the ears 49 on the spider 50 by means of the pivot tube 48. The tension bolts are turned for a sufficient amount to swing the arm 25 and valve 23 through a small arc and thereby separate the valve 23 from the seat member 20. When the arm 25 and valve 23 have been swung to a position as shown in Figure 6, the entire actuator assembly, together with the swinging arm and valve, may be withdrawn vertically through the lateral opening 69. The diaphragm 18, stem 59, springs 41, spider 50, link 55, swinging arm 25 and valve 23, are withdrawn as a unitary assembly and this is accomplished without injury to the seating surface 22 or valve disk 24. The tension bolts 121 are also useful in confining the springs 41 against movement during the operation of assembling the working parts into position within the housing.

In operation the flow of fluid through the flow-measuring meter 10 produces a drop in unit pressure so that the pressure upstream from the meter 10 is somewhat higher than the pressure downstream therefrom. This pressure drop is used to advantage in my device since it affords a means of providing a pressure differential across the pilot valve diaphragm 6 when heavy flow is taking place through the housing 12 from the inlet 15 to the outlet 16. The proportions of the parts and the strength of the pilot valve spring 86 can be so chosen that the pilot valve 5 remains fully open whenever there is a pressure differential of 8 p.s.i. across the diaphragm 6. For example, if the suply line pressure upstream from the meter 10 is 60 p.s.i., this pressure is transmitted to the space 40, and so long as the pressure within the housing 12 communicated by passageway 7 to the interior of the cap 66 remains below 52 p.s.i., the pilot valve remains open. This 60 p.s.i. pressure therefore is communicated to the chamber 2 and acts over the upper surface of the diaphragm 18. This pressure in the chamber 2 forces the diaphragm 18 downward and holds the swinging arm 25 and valve 23 in the retracted position so that a clear passage with minimum restriction is provided between the inlet 15 and outlet 16 of the housing 12. If the demand for fluid in the service line 9 diminishes or ceases temporarily, the pressure in the housing 12 rises until it exceeds 52 p.s.i. The pilot valve 5 then closes, thereby cutting off communication between the space 40 and the chamber 2. In its closing operation the pilot valve 5 acts to open the equalizer valve 88, as described above, so that pressure in the chamber 2 escapes into the interior of the cap 66 and through passageway 7 into the interior of the housing 12. Valve 19 then tends to close under the action of springs 41. Should the pressure in the housing 12 rise above 56 p.s.i., for example, due to leakage through valve 19 or fluid flowing reversely through the second check valve 13, the drain valve 45 will open under the action of its diaphragm 43 and spring 44. The interior of the housing 12 is thereby vented to atmosphere through the lateral port 46. Lowering of the pressure within the housing 12 brought about by this venting action serves to reestablish the required pressure differential across the diaphragm 43 to permit the drain valve 45 to close.

In the event that the pressure in the supply line 8 should fall below 8 p.s.i. (in the example given above), or in the event that it should be subjected to vacuum pressure, the pilot valve 5 closes and the equalizer valve 88 opens to establish communication between the chamber 2 and the interior of the housing 12. This permits the springs 41 to close the main valve 19. Should the unit pressure in the supply line fall below 4 p.s.i., for example, the drain valve 45 opens and remains open so long as the abnormally low pressure or vacuum conditions exist in the supply line 8. Any possibility of backflow from the service line 9 into the supply line 8 is thereby avoided.

The check valve assembly 13 is mounted downstream from the housing 12, and its purpose is to prevent loss of any appreciable quantity of fluid from the service line 9, should a backflow condition exist. As shown in Figure 2, the check valve 13 is provided with a valve assembly 19a which is substantially the same as that described above and designated 19. The valve assembly 19a includes the seat member 20a and the valve 23a. The swinging arm 25a is pivoted at 130. A weight 131 is fixed to the swinging arm 25a within the interior of the check valve 13.

An auxiliary flow-measuring meter 132 may be mounted in the pressure supply conduit 4, and when so mounted this meter 132 provides a record of the amount of fluid used in opening and closing the main valve 19 within the housing 12.

Figure 4:
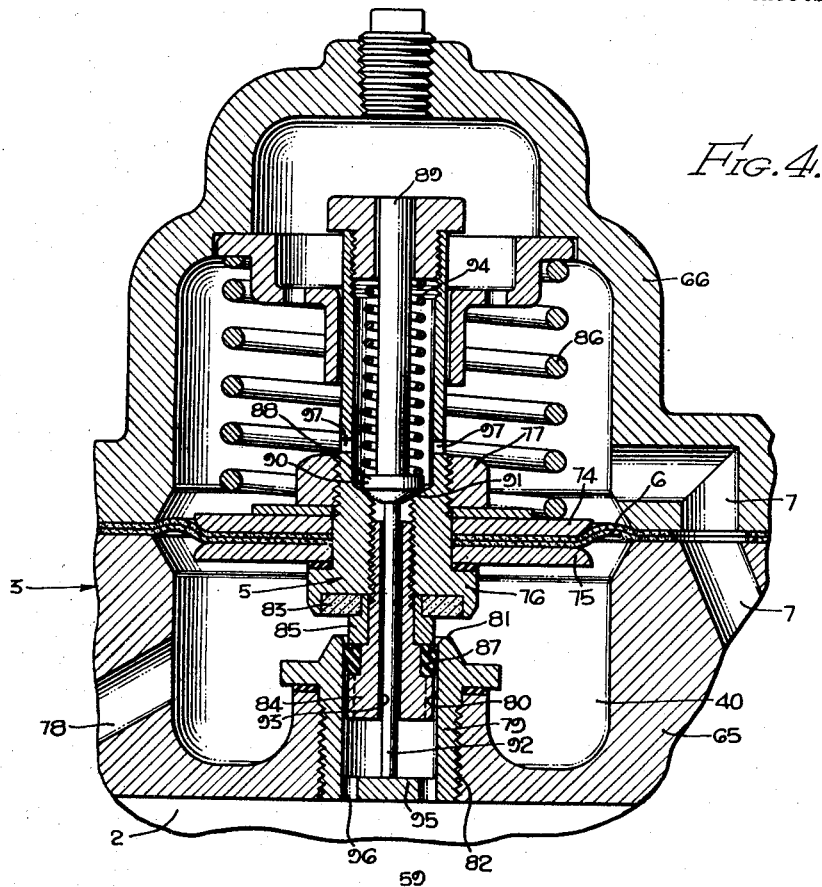
Figure 4 is a sectional view on an enlarged scale showing the upper portion of the apparatus illustrated in Figure 3.
Figure 10:
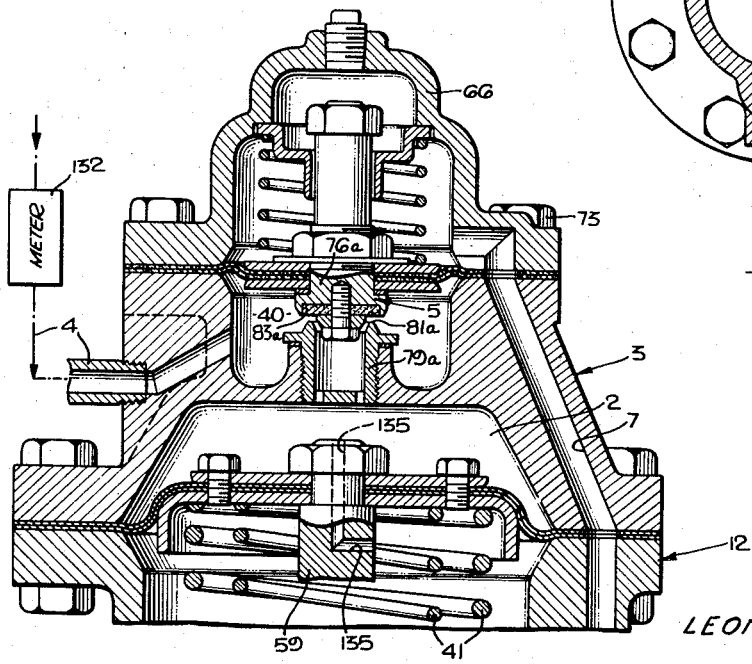
Figure 10 is a sectional view partly broken away showing a modified form of my invention.

In the modified form of my invention shown in Figure 10, the equalizer valve is omitted from the pilot valve assembly, and instead an equalizer passage 135 is provided in the upper portion of the stem 59. This equalizer passage 135 is smaller in size than the passage through conduit 4 and serves as a by-pass between the chamber 2 and the interior of the housing 12. The head 76a of the pilot valve 5a is made solid instead of tubular and the equalizer valve assembly 88 is omitted. When the disk 83a seats on the upper end 81a of the seat member 79a, fluid is prevented from passing from the space 40 into the chamber 2. When the pilot valve 5a is closed, the springs 41 move the stem 59 upward while fluid in the chamber 2 passes downward through the equalizer passage 135 into the space in the housing 12. When the pilot valve 5a is open, pressure fluid passes from the space 40 into the chamber 2 in volume sufficient to minimize the effect of the open passageway 135. The form of my invention shown in Figure 10 is simpler than that shown in Figure 4 but has the disadvantage that a small amount of fluid continually leaks through the equalizer pasasge 135 whenever the main valve 19 is open. In certain types of installations, for example in fire lines, this leakage is unobjectionable. An advantage of the device shown in Figure 10 is that the constant leakage through the equalizer passage 135 minimizes the tendency of the device to "hunt."

The device of Figure 10 may be used advantageously in a number of ways. By placing a small flow-meter 132 in the pressure supply conduit 4, small flows may be measured that would not be recorded on the large meter 10. During small flows the entire amount would pass through the pilot valve 5a, and on through the equalizer passage 135, and sufficient pressure would not be created on top of diaphragm 18 to cause the main valve 19 to open. In a similar manner, the device of Figure 10 may be used when the large flow-meter 10 is omitted from an installation such as a fire line. Water for domestic purposes may be withdrawn from a fire line through an unauthorized connection. The small flow-meter would record such unauthorized use. This small meter 132 eliminates the requirement for a conventional detector check where a backflow preventer is required on a fire line.

Figure 8:
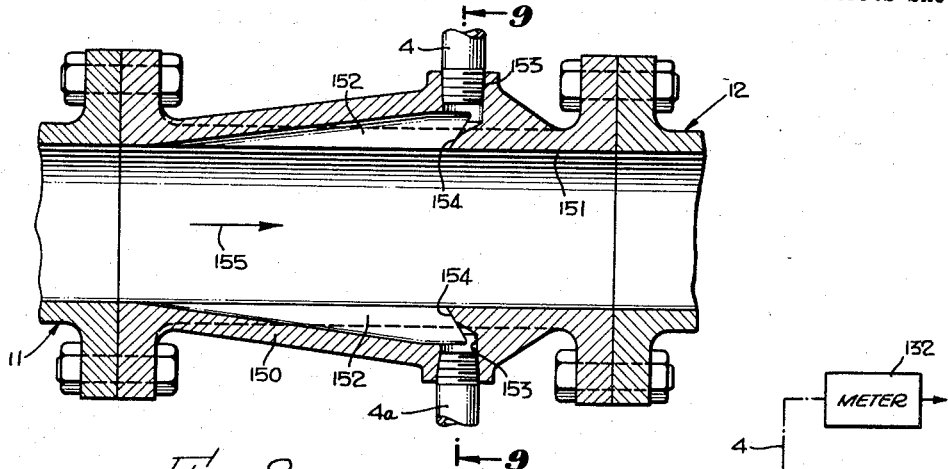
Figure 8 is a longitudinal sectional view showing the pressure increasing device used in connection with the modified form of my invention.
Figure 9:
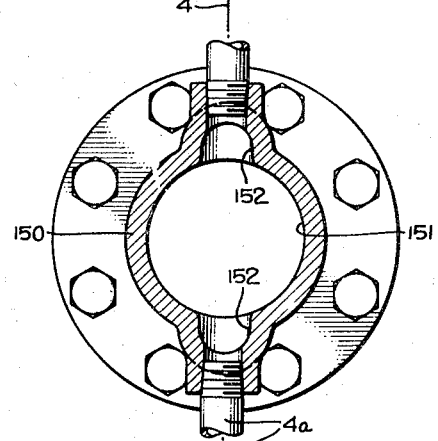
Figure 9 is a transverse sectional elevation taken substantially on the line 9—9 as shown in Figure 8.

The device shown in Figures 8 and 9 represents a further modification of my invention. This device may be used when the large flow-measuring meter 10 or other pressure-drop inducing device is not present in the installation. In such event the pressure drop through such meter, water-softener, or other device, is not available for establishing the necessary pressure differential for proper operation of the actuator 17 and the drain valve 45. As shown in Figure 8, a flanged tubular section 150 is installed between the gate valve 11 and the housing 12. The bore 151 is the same as the full opening of the supply line 8 and gate valve 11. Tapered slots 152 are provided in the wall of the tubular section 150 and the depth of these slots increases in the direction of flow. Lateral outlets 153 are provided which communicate with the slots 152 at the location of their greatest depth and the pressure supply conduits 4 and 4a are connected to these lateral outlets. The slots 152 terminate abruptly at shoulders 154. When flow of fluid occurs through the bore 151 in the direction of the arrow 155, the pressure of the fluid in the lateral outlets 153 is raised by the Pitot tube effect. In this way the unit pressure within the conduits 4 and 4a is raised above the unit pressure of the fluid passing through the bore 151. Under no-flow conditions, of course, the pressure in the conduits 4 and 4a is the same as that existing in the bore 151. The small flow-measuring meter 132 may be placed in the conduit 4 to measure the amount of fluid introduced into the space 40. The form of my invention illustrated in Figures 8 and 9 may be used in connection with the pilot valve and equalizer valve assemblies shown in Figure 4 or with the pilot valve and equalizer passage shown in Figure 10.

Figure 7:
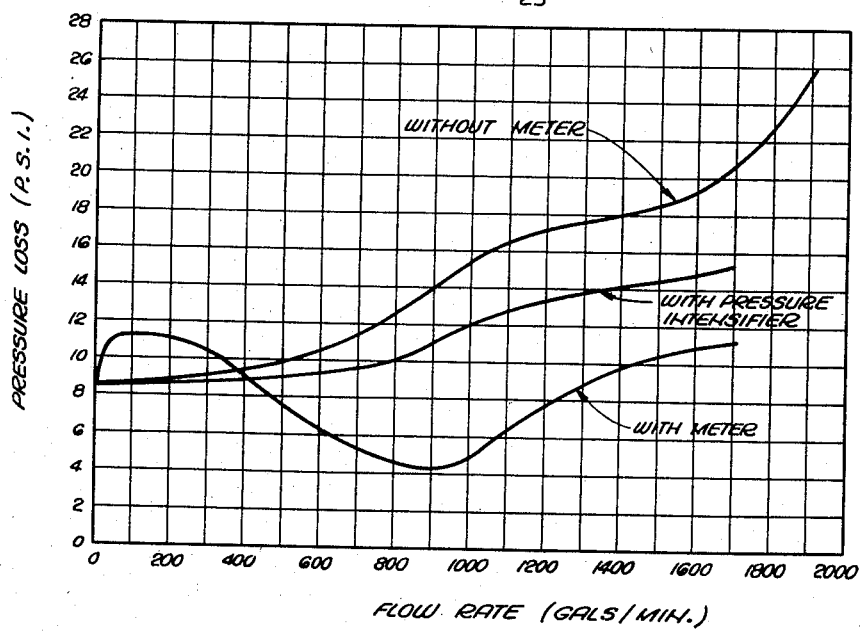
Figure 7 is a graph showing pressure loss in pounds per square inch for various flow rates in gallons per minute across the backflow prevention apparatus embodying my invention.

The graph of Figure 7 shows typical curves illustrating how the pressure drop across the backflow prevention apparatus varies with the flow rate. The upper curve shows the pressure loss between the housing inlet 15 and the downstream side of the second check valve 13 when no flow meter 10, water softener or other pressure reducing device is installed upstream from the housing 12. The pressure loss is relatively great because insufficient pressure differential is produced across the main diaphragm 18 to hold the valve 23 in its fully open position. The lower curve shows the pressure loss between the same two points when a pressure reducing device such as the flow meter 10 is installed upstream from the housing 12. The pressure drop through the meter 10 provides the pressure differential necessary to hold the valve 23 fully open for flow rates above 900 gallons per minute, and the pressure drop through the backflow prevention apparatus is consequently relatively low. The intermediate curve shows how the pressure loss may be cut down by means of the pressure intensifier device of Figures 8 and 9 when no flow meter 10 or other pressure reducing device is present in the supply line. The pressure loss through the backflow prevention apparatus is reduced because the pressure intensifier makes available a pressure differential across the main diaphragm 18 so that the valve 23 is maintained closer to its fully open position.

Having fully described my invention, it is to be understood that I do not wish to be limited to the details herein set forth, but my invention is of the full scope of the appended claims.

I claim:

1. In a backflow preventer for preventing return flow from a service line to a supply line, the combination of: a housing interposed between the supply line and the service line, the housing having a valve opening, a valve member within the housing movable to close the opening and prevent flow through the housing, the valve member establishing a pressure drop from the supply line to the service line under conditions of normal flow therethrough and at cessation of flow acting to prevent reverse flow, yieldable means for moving the valve member toward closed position, pressure operated means to apply a force for moving the valve member toward open position, said pressure operated means including a movable element having one face thereof subjected to pressure in the supply line upstream from said valve member and acting in a direction to open the valve member, and means for subjecting an opposed face of said element to pressure downstream from the valve member and acting in concert with said yieldable means to close the valve member.

2. The combination set forth in claim 1 in which the housing has aligned inlet and outlet openings, and wherein the valve member closes the inlet opening, and means whereby the valve member is moved to a fully open position substantially out of alignment with said openings to provide a clear way passage between the openings.

3. The combination set forth in claim 1 in which an annular seating surface is provided adjacent the valve opening and engaged by the valve member, a swinging arm pivotally mounted upon the housing, and means mounting the valve member upon the swinging arm for universal tilting movement, to promote uniform contact pressure of the valve member along the entire periphery of the seating surface.

4. The combination set forth in claim 1 wherein a pilot valve is employed for subjecting the first said face of the movable element to pressure in the supply line upstream from said device.

5. In a backflow preventer for preventing return flow from a service line to a supply line, the supply line being provided with a device which produces a substantial pressure drop during flow therethrough, the combination of: a housing interposed between the supply line and the service line, the housing having a valve opening, a valve member within the housing movable to close the opening and prevent flow through the housing, the valve member establishing an additional pressure drop from the supply line to the service line under conditions of normal flow therethrough and at cessation of flow acting to prevent reverse flow, resilient means for moving the valve member toward closed position, pressure operated means including a flexible diaphragm to apply a force for moving the valve member toward open position, means subjecting one face of said diaphragm to pressure in the supply line upstream for said device acting in a direction to open the valve member, and means subjecting an opposed face of the diaphragm to pressure downstream from the valve member and acting in the direction of said yieldable means to close the valve member.

6. The combination set forth in claim 5 wherein a pilot valve is provided for subjecting the diaphragm to pressure in the supply line upstream from the said device.

7. In a backflow preventer of the clearway type for preventing return flow from a service line to a supply line, the combination of: a housing having a valve chamber, a coaxial inlet and outlet separated by said chamber, a pivotally mounted valve movable within said housing between a closed position capping the inlet and an open position laterally clear of said inlet and outlet, an actuator for moving the valve from said closed position to said open position, and means automatically rendering the actuator inoperative under no-flow conditions.

8. In a backflow preventer of the reduced pressure type for preventing return flow from a service line to a supply line and employing a pair of check valves defining a reduced pressure zone therebetween, and having a drain valve for venting said zone to atmosphere, the improvement comprising: a housing having an inlet and an outlet, means mounting one of the check valves within the housing and movable from a first position closing the inlet to a second position remote from the inlet, a pressure operated actuator for moving the said valve from said first position to said second position, fluid pressure supply means for said actuator, and means including a pilot valve operable by pressure differential at two points spaced along the path of flow through said lines, the pilot valve closing and hence interrupting the supply of fluid pressure to said actuator under conditions of no-flow through the housing.

9. In a backflow preventer for preventing return flow from a service line to a supply line, the combination of: a housing having a valve chamber, a coaxial inlet and outlet separated by said chamber, a pivotally mounted valve movable within said housing between a closed position capping the inlet and an open position laterally clear of said inlet and outlet, a pressure operated actuator for moving the valve from said first position to said second position, said means including a diaphragm having one face thereof subjected to pressure within the housing downstream from the inlet, means including a pilot valve for subjecting the other face of the diaphragm to pressure in the supply line upstream from the housing, and means responsive to the difference in pressure in the supply line and the housing for actuating the pilot valve.

10. In a backflow preventer of the clearway type for preventing return flow from a service line to a supply line, the combination of: a housing having a valve chamber, a coaxial inlet and outlet separated by said chamber, a pivotally mounted valve movable within said housing between a closed position capping the inlet and an open position laterally clear of said inlet and outlet, a pressure operated actuator for moving the valve from said first position to said second position, said means including a diaphragm having one face thereof subjected to pressure within the housing downstream from the inlet, means including a pilot valve for subjecting the other face of the diaphragm to pressure in the supply line upstream from the housing, and means for actuating the pilot valve including a second diaphragm having one face thereof subjected to pressure within the housing and the other face thereof subjected to pressure in the supply line upstream from the housing.

11. In a backflow preventer of the clear-way type for preventing return flow from a service line to a supply line, the combination of: a housing having an aligned inlet and outlet, a valve disk within the housing and movable from a first position closing the inlet to a second position out of alignment with the inlet and outlet, a swinging arm pivotally mounted within the housing for swinging the valve disk between said first and second positions, pressure operated means for swinging said arm about its pivot, said means including a diaphragm having one face thereof subjected to pressure within the housing downstream from the inlet, and means including a pilot valve for subjecting the other face of the diaphragm to pressure in the supply line upstream from the housing, and means responsive to the difference in pressure in the supply line and the housing for actuating the pilot valve.

12. In a backflow preventer for preventing return flow from a service line to a supply line, the supply line being provided with a device which produces a substantial pressure drop during flow therethrough, the combination of: a housing having a valve chamber, a coaxial inlet and outlet separated by said chamber, a pivotally mounted valve movable within said housing between a closed position capping the inlet and an open position laterally clear of said inlet and outlet, pressure operated means for moving the valve between said first and second positions, said means including a diaphragm having one face thereof subjected to pressure within the housing downstream from the inlet and acting on the diaphragm in a direction to close the valve, and means for subjecting the other face of the diaphragm to pressure in the supply line upstream from said device.

13. In a backflow preventer for preventing return flow from a service line to a supply line provided with a flowmeter having a substantial pressure drop during flow therethrough, the combination of: a housing having an inlet and an outlet, a valve seat associated with the inlet, a valve within the housing and movable from a closed position in sealing relationship against said seat to a retracted position remote therefrom, a swinging arm pivotally mounted within the housing for swinging the valve between said closed and retracted positions, pressure operated means for swinging said arm about its pivot, said means including a diaphragm having one face thereof subjected to pressure within the housing, and means for subjecting the other face of the diaphragm to pressure in the supply line upstream from the flow-meter.

14. In a backflow preventer of the clear-way type for preventing return flow from a service line to a supply line provided with a flow-meter having a substantial pressure drop during flow therethrough, the combination of: a housing having an inlet and an outlet and a clear-way passage therebetween, a valve within the housing and movable from a first position closing the inlet to a second position out of alignment with the clear-way passage, pressure operated means for moving the valve between said first and second positions, said means including a diaphragm having one face thereof subjected to pressure within the housing, means including a pressure supply conduit for subjecting the other face of the diaphragm to pressure in the supply line upstream from the meter, means forming a leakage path from a location in communication with said other face of the diaphragm to a location communicating with the interior of the housing downstream from said inlet and an auxiliary flow-meter in said pressure supply conduit.

15. In a backflow preventer for preventing return flow from a service line to a supply line, the combination of: a housing having an inlet and an outlet, a valve within the housing and movable from a first position closing the inlet to a second position remote from the inlet, pressure operated means for moving the valve between said first and second positions, said means including a diaphragm having one face thereof subjected to pressure within the housing, means including a pressure supply conduit and a pilot valve for subjecting the other face of the diaphragm to pressure in the supply line upstream from the housing, means forming a leakage path from a location in communication with said other face of the diaphragm to a location communicating with the interior of the housing downstream from said inlet, and a flow-meter in said pressure supply conduit.

16. In a backflow preventer for preventing return flow from a service line to a supply line, the combination of: a housing having a valve chamber, a coaxial inlet and outlet separated by said chamber, a pivotally mounted valve movable within said housing between a closed position capping the inlet and an opening position laterally clear of said inlet and outlet, pressure operated means for moving the valve between said closed and open positions, said means including a diaphragm having one face thereof exposed to said valve chamber downstream from said inlet and tending in response to pressure downstream of said valve to close said valve, a device positioned in the supply line upstream from the housing and having means operating on the Pitot tube principle to develop pressure in a lateral outlet greater than the pressure of the main fluid flow through the device, and means including a pilot valve for subjecting the other face of the diaphragm to the pressure in said lateral outlet, and thereby tending during flow through said valve to maintain said valve in its open position in response to the greater pressure in said lateral outlet.

17. In a backflow preventer for preventing return flow from a service line to a supply line, the combination of: a housing having an inlet and an outlet, a valve seat associated with the inlet, a valve disk within the housing and movable from a closed position against the seat to an open position remote from the seat, means for moving the valve disk between open and closed positions, said means including a diaphragm having one face thereof subjected to pressure within the housing downstream from the inlet, means including a pilot valve for subjecting the other face of the diaphragm to pressure in the supply line upstream from the housing, means responsive to the difference in pressure in the supply line and the housing for actuating the pilot valve, and an equalizer passage constituting a by-pass across the diaphragm.

18. In a backflow preventer for preventing return flow from a service line to a supply line, the combination of: a housing having an inlet and an outlet, a valve seat associated with the inlet, a valve disk within the housing and movable from a closed position against the seat to an open position remote from the seat, a swinging arm pivotally mounted within the housing for swinging the valve disk between open and closed positions, means including a spring operatively connected to swing the arm toward closed position, said means also including a diaphragm operable to swing the arm toward open position in opposition to the spring, the diaphragm having one face thereof subjected to pressure within the housing downstream from the inlet, and means including a pilot valve for subjecting the other face of the diaphragm to pressure in the supply line upstream from the housing, and means responsive to the difference in pressure in the supply line and the housing for actuating the pilot valve.

19. In a backflow preventer for preventing return flow from a service line to a supply line, the combination of: a housing having an inlet and outlet, a valve seat associated with the inlet, a valve disk within the housing and movable from a closed position against the seat to an open position remote from the seat, a swinging arm pivotally mounted within the housing for swinging the valve disk between open and closed positions, means for swinging said arm about its pivot, said means including a diaphragm having one face thereof subjected to pressure within the housing downstream from the inlet, means including a pilot valve for subjecting the other face of the diaphragm to pressure in the supply line upstream from the housing, the pilot valve being operable by differential pressure at two points spaced along the path of flow through said lines, the pilot valve closing under conditions of no-flow through the housing, and means rendering the diaphragm inoperative upon closing of the pilot valve.

20. In a backflow preventer of the reduced pressure type for preventing return flow from a service line to a supply line, the combination of: a housing having an inlet and an outlet, a valve seat associated with the inlet, a valve disk within the housing and movable from a closed position adjacent the seat to an open position remote from the seat, spring means for moving the valve disk toward closed position, pressure operated means for moving the valve disk toward open position, said pressure-operated means including a diaphragm having one face thereof subjected to pressure within the housing, means for subjecting the other face of the diaphragm to pressure in the supply line upstream from the housing, said means including a pilot valve operable by pressure differential at two points spaced along the path of flow through said lines, the pilot valve closing and hence interrupting the supply of pressure fluid to said other face of the diaphragm under conditions of no-flow, a drain valve for venting the housing to atmosphere, means acting in a direction to open the drain valve, and means responsive to the difference in pressure in the housing and in the supply line upstream from the housing for closing the drain valve.

21. Backflow prevention apparatus having in combination: a housing provided with an inlet and an outlet and having a lateral opening, a bonnet normally closing the lateral opening, a valve within the housing and movable to a position to close the inlet, actuator means for moving the valve, said actuator means including pressure responsive means for opening the valve and spring means operable to close the valve, tension elements for rendering the spring means inactive, the valve, actuator means and tension elements being movable as a unitary assembly from the housing through the lateral opening upon removal of the bonnet.

22. Backflow prevention apparatus having in combination: a housing provided with an inlet and an outlet and having a lateral opening, a bonnet normally closing the lateral opening, a valve within the housing and movable to a position to close the inlet, a swinging arm carrying said valve, pivot means supporting the arm relative to the housing, actuator means for swinging the arm, said actuator means including pressure responsive means for opening the valve and spring means operable to close the valve, tension elements for rendering the spring means inactive, the valve, actuator means and tension elements being movable as a unitary assembly from the housing through the lateral opening upon removal of the bonnet and disconnection of the pivot means.

23. Backflow prevention apparatus having in combination: a housing provided with an inlet and an outlet and having a lateral opening, a bonnet normally closing the lateral opeing, a valve within the housing and movable to a position to close the inlet, a swinging arm carrying the said valve, pivot means supporting the arm relative to the housing, a stem movable axially with respect to said housing, linkage means connecting the stem to said arm, a flexible diaphragm having its outer portion clamped between the housing and the bonnet and its inner portion fixed relative to the stem, spring means encircling the stem and acting to move the stem in a direction to close the valve, tension elements insertable into the housing upon removal of the bonnet and acting to immobilize the spring means, the valve, arm, linkage means, stem, spring means, diaphragm and tension elements being movable as a unitary assembly from the housing through the lateral opening upon disconnection of the pivot means.

24. Backflow prevention apparatus having in combination: a housing provided with an inlet and an outlet and having a lateral opening, a bonnet normally closing the lateral opening, a valve within the housing and movable to a position to close the inlet, a swinging arm carrying said valve, pivot means supporting the arm relative to the housing, a statonary spider within the housing pivotally connected to said arm, a stem movable axially with respect to said spider, linkage means connecting the stem to said arm, a flexible diaphragm having its outer portion clamped between the housing and the bonnet and its inner portion fixed relative to the stem, spring means encircling the stem and operatively interposed between the spider and the stem, the spring means acting to move the stem in a direction to close the valve, tension elements insertable axially through the diaphragm upon removal of the bonnet from the housing and engageable with the spider to limit movement of the stem relative to the spider, the valve, arm, linkage means, stem, spider, spring means, diaphragm and tension elements being movable as a unitary assembly from the housing through the lateral opening upon disconnection of the pivot means.

25. Backflow prevention apparatus having in combination: a housing provided with an inlet and an outlet and having a lateral opening, a bonnet normally closing the lateral opening, a valve within the housing and movable to a position to close the inlet, a swinging arm carrying said valve, pivot means supporting the arm relative to the housing, the housing having a shoulder therein, a stationary spider supported on the shoulder within the housing and pivotally connected to said arm, a stem movable axially with respect to said spider, a link connecting the stem to said arm, a flexible diaphragm having its outer portion clamped between the housing and the bonnet and its inner portion fixed relative to the stem, the bonnet and diaphragm cooperating to form a pressure chamber, spring means encircling the stem and operatively interposed between the spider and the stem, the spring means acting to move the stem in a direction to close the valve, and means including a pilot valve for subjecting the pressure chamber to pressure greater than the pressure within the housing when fluid flows through the housing.

26. In a backflow preventer of the reduced pressure type for preventing return flow from a service line to a supply line and employing a pair of check valves defining a reduced pressure zone therebetween, the improvement comprising: a housing having an inlet and an outlet, a valve seat associated with the inlet, one of the check valves comprising a valve disk within the housing and movable from a closed position adjacent the seat to an open position remote from the seat, spring means for moving the valve disk toward closed position, pressure operated means for moving the valve disk toward open position, said pressure operated means including a diaphragm having one face thereof subjected to pressure in the reduced pressure zone within the housing, means for subjecting the other face of the diaphragm to pressure in the supply line upstream from the housing, said means including a pilot valve operable by pressure differential at two points spaced along the path of flow through said lines, the pilot valve closing and hence interrupting the supply of pressure fluid to said other face of the diaphragm under conditions of no-flow, a drain valve for venting the housing to atmosphere, means acting in a direction to open the drain valve, and means responsive to the difference in pressure in the housing and in the supply line upstream from the housing for closing the drain valve.

References Cited in the file of this patent

UNITED STATES PATENTS

| | | |
|---|---|---|
| 1,105,991 | Miller | Aug. 4, 1914 |
| 2,257,171 | King | Sept. 30, 1941 |
| 2,583,006 | Niesemann | Jan. 22, 1952 |
| 2,706,488 | Harrington | Apr. 19, 1955 |